(12) United States Patent
Edke et al.

(10) Patent No.: US 11,542,841 B2
(45) Date of Patent: Jan. 3, 2023

(54) CASTELLATION MECHANISM WITH REVERSE RESET

(71) Applicant: Eaton Intelligent Power Limited, Dublin (IE)

(72) Inventors: Pritam Edke, Pune (IN); Nikhil Saggam, Pune (IN); Nicola Andrisani, Cumiana (IT)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/404,250

(22) Filed: Aug. 17, 2021

(65) Prior Publication Data

US 2021/0372299 A1 Dec. 2, 2021

Related U.S. Application Data

(63) Continuation of application No. PCT/EP2020/025091, filed on Feb. 25, 2020.

(30) Foreign Application Priority Data

Feb. 25, 2019 (IN) .............................. 201911007308
Jul. 20, 2019 (IN) .............................. 201911029316

(51) Int. Cl.
*F01L 1/24* (2006.01)
*F01L 1/18* (2006.01)
(Continued)

(52) U.S. Cl.
CPC ............. *F01L 1/2411* (2013.01); *F01L 1/181* (2013.01); *F01L 1/267* (2013.01); *F01L 1/46* (2013.01);
(Continued)

(58) Field of Classification Search
CPC ......... F01L 1/181; F01L 1/2411; F01L 1/267; F01L 2001/467; F01L 2800/10; F02D 13/0226; F02D 13/0246
(Continued)

(56) References Cited

U.S. PATENT DOCUMENTS 9,068,478 B2 * 6/2015 Roberts ............... F01L 13/0036
2014/0238015 A1 8/2014 Roberts et al.
(Continued)

FOREIGN PATENT DOCUMENTS

WO 2017157413 A1 9/2017
WO 2019036272 A1 2/2019
(Continued)

OTHER PUBLICATIONS

International Search Report and Written Opinion for International Application No. PCT/EP2020/025091 dated Jun. 19, 2020.

*Primary Examiner* — Jorge L Leon, Jr.
(74) *Attorney, Agent, or Firm* — RMCK Law Group PLC (57) ABSTRACT

A rocker arm assembly operable in an engine drive mode and at least one of a late intake valve closing (LIVC) mode and an internal exhaust gas recirculation (iEGR) mode, the rocker arm assembly selectively opening first and second engine valves. The rocker arm assembly includes a rocker arm configured to rotate about a rocker shaft, and a reverse reset capsule assembly movable between (i) a locked position configured to perform one of an LIVC operation and an iEGR operation, and (ii) an unlocked position that does not perform the LIVC operation or the iEGR operation. An actuator assembly is configured to selectively move the reverse reset capsule assembly between the locked and unlocked positions.

19 Claims, 8 Drawing Sheets

(51) Int. Cl.
*F01L 1/46* (2006.01)
*F01L 1/26* (2006.01)
(52) U.S. Cl.
CPC ..... *F01L 2001/467* (2013.01); *F01L 2800/10* (2013.01)
(58) Field of Classification Search
USPC ............ 123/90.16, 90.36, 90.4, 90.44, 90.46
See application file for complete search history.

(56) References Cited

U.S. PATENT DOCUMENTS

| | | |
|---|---|---|
| 2015/0159521 A1 | 6/2015 | Baltrucki et al. |
| 2015/0354418 A1 | 12/2015 | Jo et al. |
| 2020/0182108 A1* | 6/2020 | VanWingerden ....... F02D 13/04 |

FOREIGN PATENT DOCUMENTS

| | | | | |
|---|---|---|---|---|
| WO | WO-2019036272 A1 * | 2/2019 | .............. | F01L 1/047 |
| WO | 2019133658 A1 | 7/2019 | | |

\* cited by examiner

CASTELLATION MECHANISM WITH REVERSE RESET

CROSS-REFERENCE TO RELATED APPLICATIONS

This application is a continuation of International Application No. PCT/EP2020/025091 filed Feb. 25, 2020, which claims the benefit of Indian Pat. App. No. 201911007308, filed on Feb. 25, 2019, and Indian Pat. App. No. 201911029316, filed on Jul. 20, 2019. The disclosures of the above applications are incorporated herein by reference thereto.

FIELD

The present disclosure relates generally to a rocker arm assembly for use in a valvetrain assembly and, more particularly, to a rocker arm assembly having a capsule assembly for Late Intake Valve Closing (LIVC) and internal Exhaust Gas Recirculation (iEGR).

BACKGROUND

Combustion cycles on four-stroke internal combustion engines can be modified to achieve various desired results such as improved fuel economy. In one method, the expansion stroke is increased relative to the compression stroke. The effect is sometimes referred to as a Miller Cycle or as an Atkinson Cycle. The Miller and Atkinson Cycles can be achieved by either closing the intake valve earlier than a normal or Otto Cycle ("Base") with a shorter than normal intake valve lift duration ("EIVC"), or by closing the intake valve later by a longer than normal intake valve lift profile ("LIVC").

Various systems have been developed for altering the valve-lift characteristics for internal combustion engines. Such systems, commonly known as variable valve timing (VVT) or variable valve actuation (VVA), improve fuel economy, reduce emissions, and improve drive comfort over a range of speeds.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one example aspect, a rocker arm assembly operable in an engine drive mode and at least one of a late intake valve closing (LIVC) mode and an internal exhaust gas recirculation (iEGR) mode, the rocker arm assembly selectively opening first and second engine valves is provided. The rocker arm assembly includes a rocker arm configured to rotate about a rocker shaft, and a reverse reset capsule assembly movable between (i) a locked position configured to perform one of an LIVC operation and an iEGR operation, and (ii) an unlocked position that does not perform the LIVC operation or the iEGR operation. An actuator assembly is configured to selectively move the reverse reset capsule assembly between the first and second positions.

In addition to the foregoing, the described rocker arm assembly may include one or more of the following features: wherein the actuator assembly is hydraulically controlled to selectively move the reverse reset capsule assembly between the first and second positions; wherein the reverse reset capsule assembly is reset from one of the first and second positions to the other of the first and second positions by draining hydraulic fluid through a fluid port formed in the rocker arm; wherein the rocker arm further includes a bore to receive a lost motion assembly, and wherein the fluid port passes through the bore; and wherein the lost motion assembly includes a guide having an outer surface with a recess formed therein, and wherein the guide is configured to selectively translate from a first position where the guide fluidly blocks the fluid port, and a second position where the guide allows flow through the fluid port via the recess.

In addition to the foregoing, the described rocker arm assembly may include one or more of the following features: wherein the reverse reset capsule assembly is reset from one of the first and second positions to the other of the first and second positions by draining hydraulic fluid through a rocker shaft drain hole formed in the rocker arm; wherein the actuator assembly is mechanically controlled by a lever to selectively move the reverse reset capsule assembly between the first and second positions; wherein the lever is movable by at least one of an actuation pin or oil pressure; wherein the reverse reset capsule assembly comprises a first castellation member, a second castellation member, and a castellation biasing member that biases the first and second castellation members apart.

In addition to the foregoing, the described rocker arm assembly may include one or more of the following features: wherein the first castellation member comprises a series of first teeth and first valleys, and wherein the second castellation member comprises a series of second teeth and second valleys; wherein the first teeth and second teeth have the same width; wherein the first castellation member rotates relative to the second castellation member when moving from the unlocked position to the locked position; wherein the first and second castellation members are configured to collapse toward each other during the unlocked position; and wherein the actuator assembly comprises an actuator pin slidingly disposed within a bore formed in the rocker arm, wherein a hydraulic chamber is defined in the bore between the actuator pin and the rocker arm.

In addition to the foregoing, the described rocker arm assembly may include one or more of the following features: wherein the hydraulic chamber is fluidly coupled to a source of hydraulic fluid to selectively move the actuator pin between a first position that corresponds to the reverse reset capsule assembly locked position, and a second position that corresponds to the reverse reset capsule assembly unlocked position; a lost motion spigot assembly at least partially disposed within a bore formed in the rocker arm; and wherein the lost motion spigot assembly comprises a guide, a shaft extending through the guide, and a lost motion biasing mechanism seated between the guide and a wall of the rocker arm forming the bore.

In addition to the foregoing, the described rocker arm assembly may include one or more of the following features: wherein the reverse reset capsule assembly is disposed within a bore formed in the rocker arm and comprises a retainer, a lash adjustment screw, a first castellation member, a second castellation member operatively associated with the first castellation member, a castellation shaft extending through the retainer, the lash adjustment screw, and the first and second castellation members, and a castellation biasing mechanism disposed between the first and second castellation members and configured to bias the first and second castellation members apart; and wherein the reverse reset capsule assembly further comprises a castellation nut coupled to the lash adjustment screw, and wherein the castellation shaft is configured to slide within the lash adjustment screw.

In another example aspect, a valvetrain assembly is provided. The valvetrain assembly includes a first engine valve, a second engine valve, a valve bridge operatively associated with the first and second engine valves, and a rocker arm assembly. The rocker arm assembly includes a rocker arm rotatably coupled to a rocker shaft, and a lost motion spigot assembly at least partially disposed within a first bore formed in the rocker arm, the lost motion spigot assembly configured to selectively engage the valve bridge to actuate the first and second engine valves. A reverse reset capsule assembly is at least partially disposed within a second bore formed in the rocker arm, and movable between (i) a locked position configured to perform one of a late intake valve closing (LIVC) operation and an internal exhaust gas recirculation (iEGR) operation by engaging only the second engine valve, and (ii) an unlocked position that does not perform the LIVC operation or the iEGR operation. An actuator assembly is at least partially disposed within a third bore formed in the rocker arm, and configured to selectively move the reverse reset capsule assembly between the first and second positions.

BRIEF DESCRIPTION OF THE DRAWINGS

The present disclosure will become more fully understood from the detailed description and the accompanying drawings, wherein.

DETAILED DESCRIPTION

Described herein is a valvetrain assembly having a capsule assembly with reverse reset for late intake valve closing (LIVC) and internal exhaust gas recirculation (iEGR) variable valve actuation (VVA) function. A rocker arm assembly includes a castellated capsule assembly to facilitate one valve opening for LIVC and iEGR function using a reverse reset mechanism. The reverse reset of the castellation is achieved through (i) hydraulic releasing of oil through an oil channel passing through a lost motion mechanism, (ii) hydraulic releasing of oil through a rocker shaft drain hole, and/or (ii) external actuation using an externally actuated elastic member to reset the castellation mechanism. Accordingly, the described systems reduce engine out emissions and provide exhaust gas thermal management. Depending on the engine and intended benefits, the described systems may implement VVA function on a single valve in four-valve engine configurations.

Figure 1:
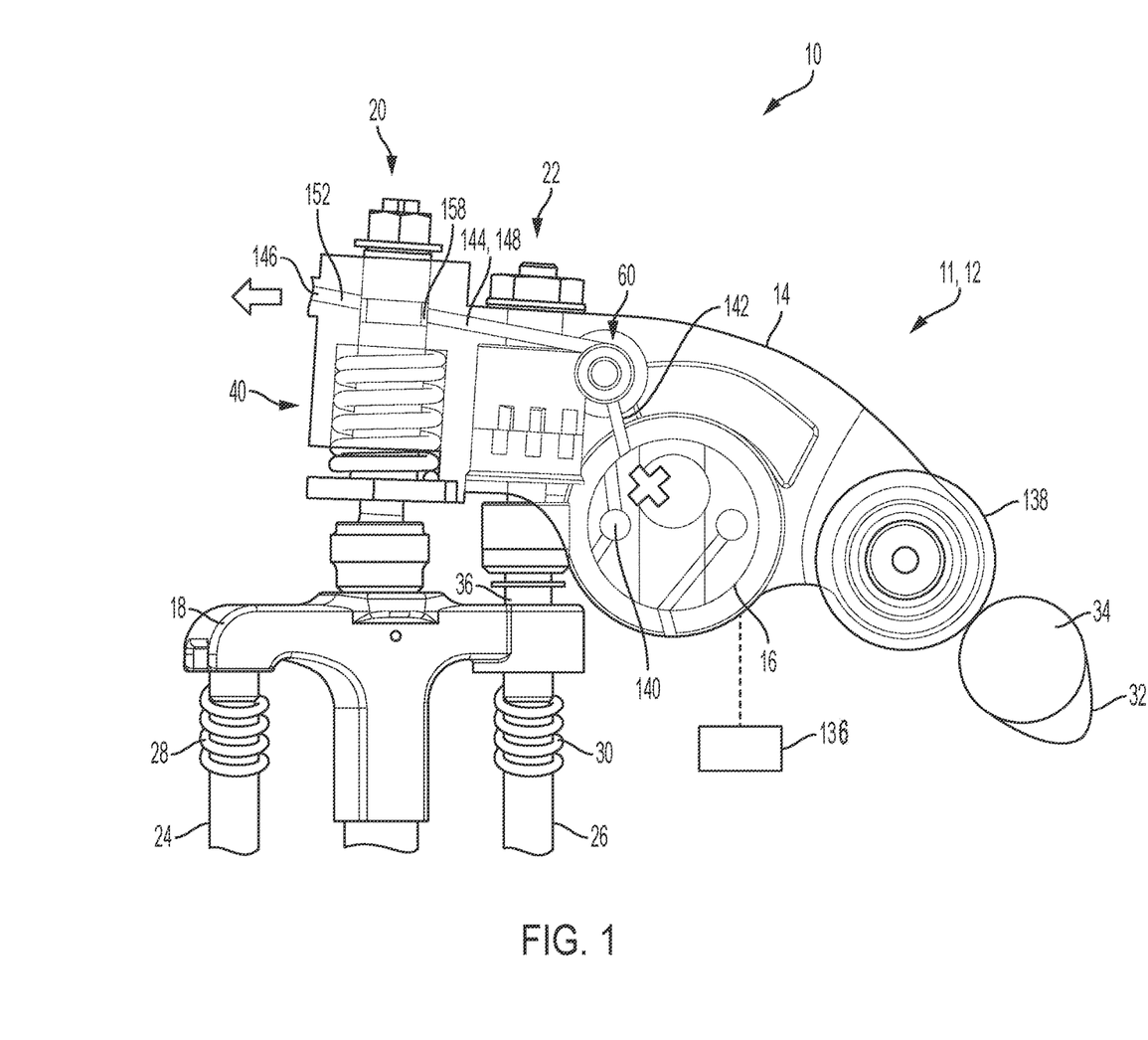
FIG. 1 is a perspective view of a partial valvetrain assembly including a rocker arm assembly constructed in accordance to one example of the present disclosure and configured to cooperate with a valve bridge and first and second intake valves.

With initial reference to FIG. 1, a partial valvetrain assembly constructed in accordance to one example of the present disclosure is shown and generally identified at reference 10. The partial valvetrain assembly 10 utilizes LIVC and iEGR VVA function and is shown configured for use in a six-cylinder engine. It will be appreciated however that the present teachings are not so limited. In this regard, the present disclosure may be used in any valvetrain assembly that utilizes LIVC or iEGR.

Figure 7:
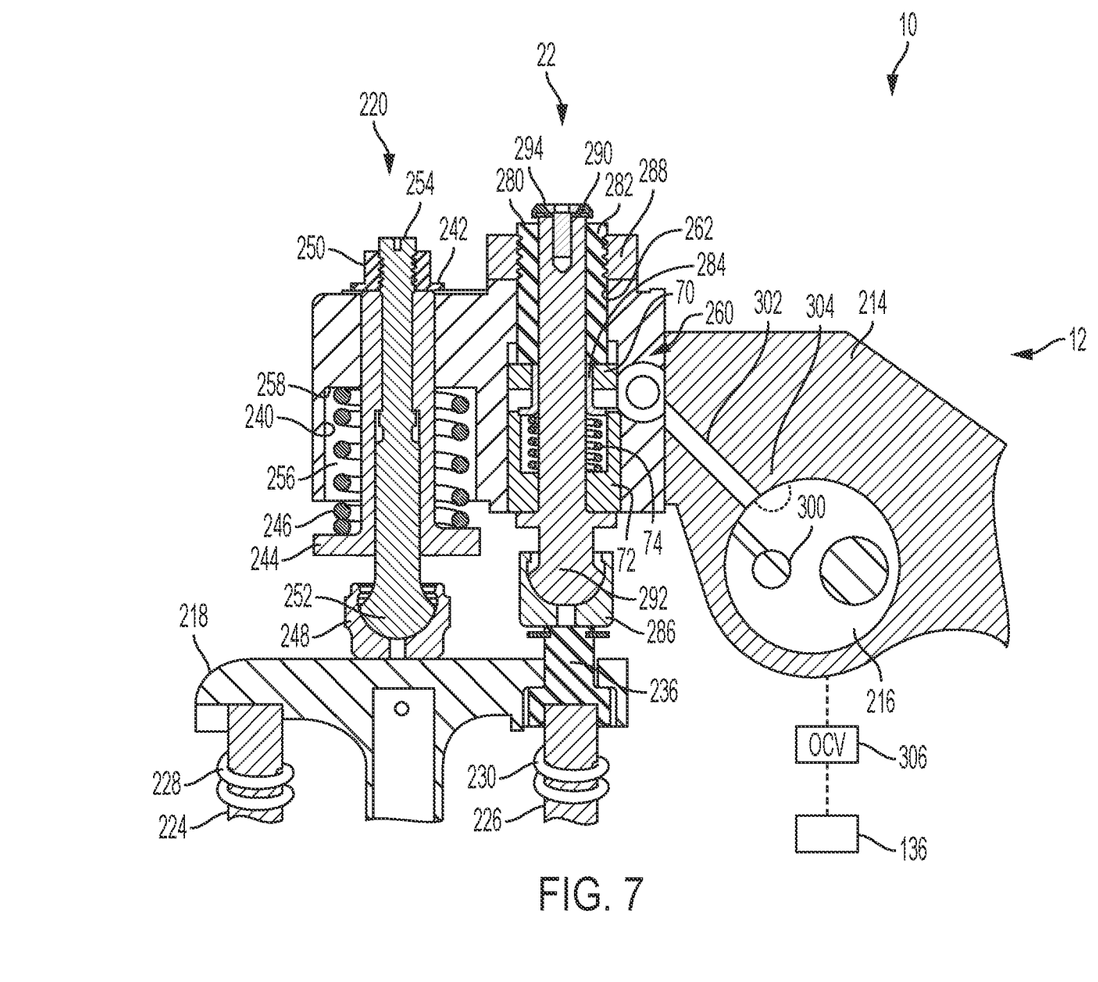
FIG. 7 is a cross-sectional view of another example rocker arm assembly that may be utilized in the valvetrain assembly shown in FIG. 1.

The partial valvetrain assembly 10 is supported in a valvetrain carrier (not specifically shown) and can include two rocker arms per cylinder. In the example embodiment, each cylinder includes an exhaust valve rocker arm assembly 11 and an intake valve rocker arm assembly 12 (FIG. 7). It will be appreciated that the intake valve rocker arm assembly 12 can be the same as exhaust valve rocker arm assembly 11 or similar with only minor structural modification. The exhaust valve rocker arm assembly 11 is configured to control motion of exhaust valves of an associated engine, for example during operation in an iEGR mode.

In the example embodiment, the intake valve rocker arm assembly 12 incorporates integrated LIVC functionality and is configured to control opening of intake valves of the engine. In general, the intake valve rocker arm assembly 12 is configured to control intake valve motion in a combustion engine drive mode and an LIVC mode for exhaust thermal management to improve the effectiveness of after-treatment systems. In the example implementation, the rocker arm assemblies 11, 12 utilize a castellation capsule with hydraulic actuation and a reverse reset logic to enable LIVC, iEGR, and normal drive modes, as will be described herein in more detail.

With additional reference to FIGS. 2-4, exhaust valve rocker arm assembly 11 will be described in more detail. In the example embodiment, rocker arm assemblies 11, 12 are similar except for a size, shape, design, etc. of a rocker arm body 14. Accordingly, while the exhaust valve rocker arm assembly 11 will be described, it will be appreciated that the same or similar features, components, etc. may also be utilized with intake valve rocker arm assembly 12. In one example, the exhaust valve rocker arm assembly 11 can generally include a rocker arm 14 that rotates about a rocker shaft 16, a valve bridge 18, a lost motion mechanism or spigot assembly 20, and a castellated reverse reset capsule assembly 22.

In the example embodiment, the valve bridge 18 is configured to engage first and second exhaust valves 24, 26 associated with a cylinder of the engine. In the illustrated example, the first exhaust valve 24 is biased by a valve spring 28, and the second exhaust valve 26 is biased by a valve spring 30. The exhaust rocker arm 14 rotates around the rocker shaft 16 based on a lift profile 32 of a cam shaft 34, as described herein in more detail, and a pass through pin 36 is positioned on the valve bridge 18 to enable actuation of exhaust valve 26 without actuation of valve bridge 18 or first exhaust valve 24.

Figure 2:
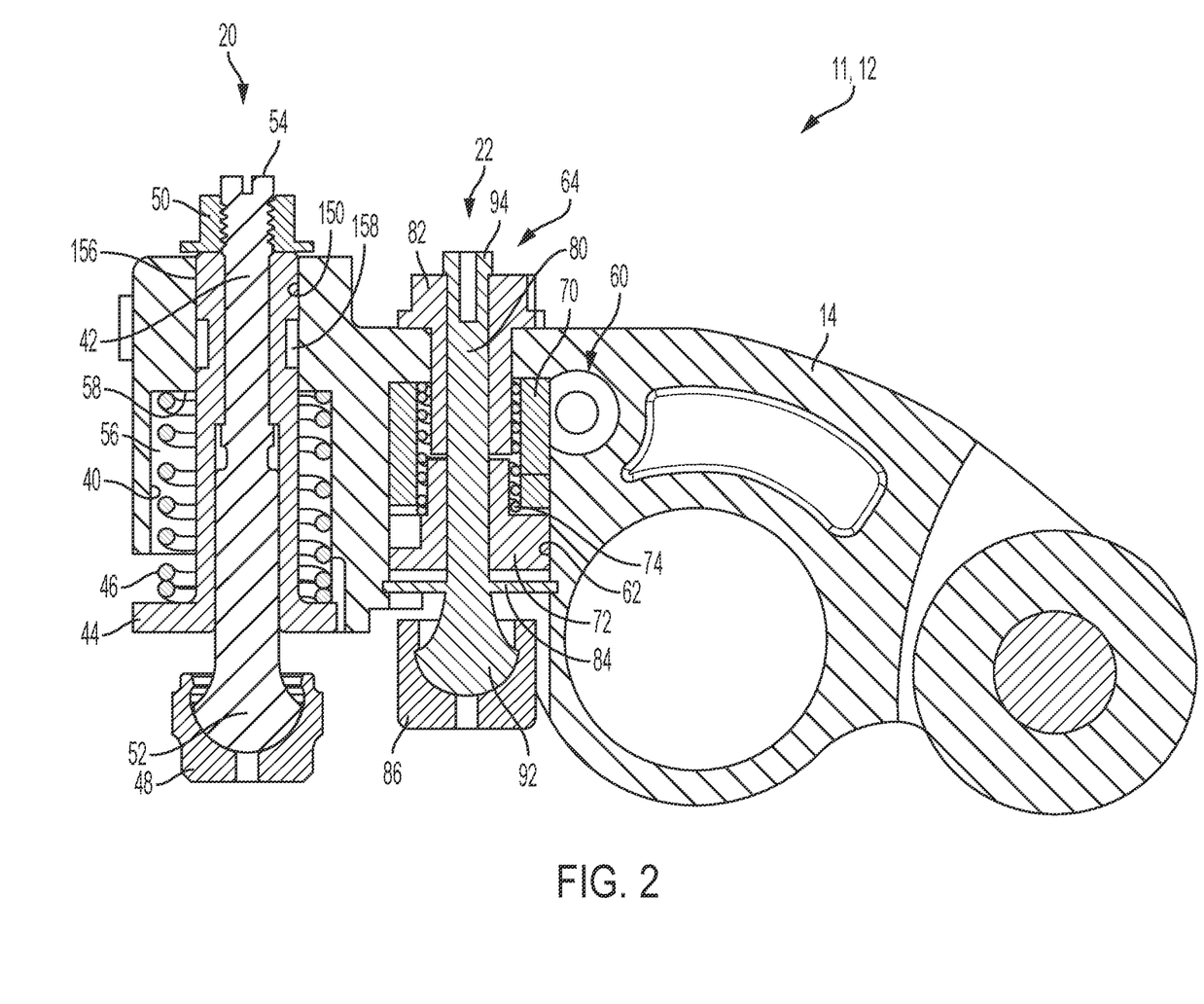
FIG. 2 is a cross-sectional view of an example rocker arm assembly that may be utilized with the valvetrain assembly shown in FIG. 1.

With reference to FIG. 2, in the example embodiment, the lost motion spigot assembly 20 is disposed within a bore 40 formed in the rocker arm 14 and generally includes a shaft 42, a guide 44, a lost motion biasing mechanism 46 (e.g., a spring), an e-foot 48, and a nut 50. The shaft 42 includes a first end 52 and an opposite second end 54 and extends through the guide 44, which is disposed within the bore 40. The lost motion biasing mechanism 46 is disposed within a cavity 56 and is seated between the guide 44 and a wall 58 partially defining the rocker arm bore 40. The e-foot 48 is coupled to or operably associated with the shaft first end 52, and the nut 50 is threadably secured to the shaft second end 54. The valve lash set at a central contact point of the bridge 18 may be adjusted by way of shaft 42 and nut 50. In this regard, the nut 50 can be adjusted (e.g., rotated) to provide a desired lost motion stroke (LMS). An anti-rotation mechanism (not shown) such as a screw can extend at least partially through the rocker arm 14 and is configured to facilitate preventing rotation of lost motion spigot assembly 20 within bore 40. Other configurations may be used.

Figure 3:
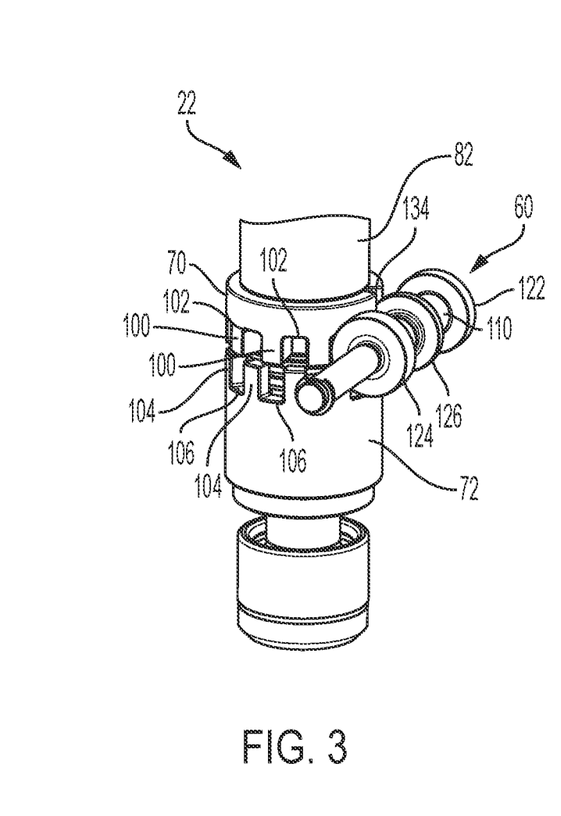
FIG. 3 is a perspective view of an example reverse reset capsule assembly that may be utilized with the rocker arm assemblies shown in FIGS. 1 and 7.
Figure 4A:
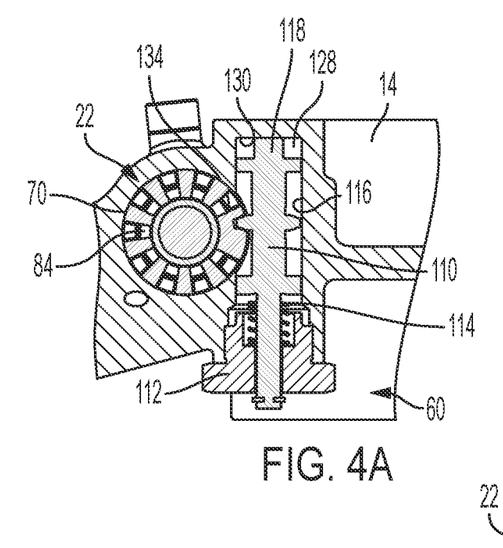
FIG. 4A is cross-sectional view of an example actuator assembly that may be utilized with the rocker arm assemblies shown in FIGS. 1 and 7, shown in a first position.
Figure 4B:
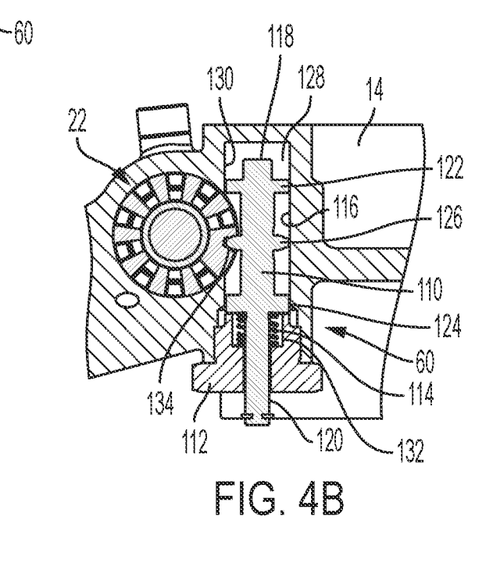
FIG. 4B is cross-sectional view of the example the actuator assembly of FIG. 4A, shown in a second position.

With continued reference to FIGS. 2-4, in the example embodiment, the reverse reset castellated capsule assembly 22 is operably associated with an actuator assembly 60. The reverse reset castellated capsule assembly 22 may have various configurations and minor structural modifications, for example, as shown between FIGS. 1 and 3. However, it will be appreciated that reverse reset castellated capsule assembly 22 can have any suitable configuration that enables reverse reset castellated capsule assembly 22 to function as described herein.

As will become appreciated from the following discussion, the actuator assembly 60 is hydraulically controlled between a first position and a second position to mechanically move the reverse reset castellated capsule assembly 22 between a respective latched or locked position (e.g., FIG. 1) and an unlatched or unlocked position (e.g., FIG. 3). Notably, the actuator assembly 60 fluidly segregates the capsule 22 from a source of hydraulic fluid. The intermediate placement of the hydraulic actuator assembly 60 between the selectively lockable reverse reset castellated capsule assembly 22 and the source of hydraulic fluid eliminates limitations associated with a fully mechanical actuator.

With further reference to FIGS. 2 and 3, in the illustrated example, the reverse reset castellated capsule assembly 22 is at least partially disposed within a bore 62 (FIG. 2) formed in the rocker arm 14 and generally includes a mechanical lash adjuster assembly 64, a first castellation member 70, a second castellation member 72, and a castellation biasing member 74. An anti-rotation mechanism (not shown) such as a screw extends at least partially through the rocker arm 14 and is configured to facilitate preventing rotation of the reverse reset castellated capsule assembly 22 within the bore 62.

As shown in FIG. 2, the mechanical lash adjuster assembly 64 generally includes a castellation shaft 80, a lash adjustment screw 82, a retainer 84, and an e-foot 86. The castellation shaft 80 includes a first end 92 and an opposite second end 94 and extends through the lash adjustment screw 82 and the retainer 84, which are disposed at least partially within the rocker arm bore 62. Moreover, the castellation shaft 80 can be configured to slide within lash adjustment screw 82. The e-foot 86 is coupled to or operably associated with the castellation shaft first end 92. The valve lash set at a contact point of the bridge 18 may be adjusted by way of lash adjustment screw 82.

As shown in FIG. 3, in the example embodiment, the first castellation member 70 can be a cup-like castellated capsule body having a series of first teeth 100 and first valleys 102, and the second castellation member 72 can be a cup-like castellated capsule body having a series of second teeth 104 and second valleys 106. As described herein in more detail, the castellation members 70, 72 can be positioned in the locked position (FIG. 1) where the first and second teeth 100, 104 engage each other, or in the unlocked position (e.g., FIG. 3) where the first and second teeth 100, 104 are respectively received within the second and first valleys 106, 102.

As shown in FIG. 2, in the example embodiment, the first castellation member 70 is seated on the retainer 84 between the lash adjustment screw 82 and the retainer 84, and the second castellation member 72 is seated on the castellation shaft 80 between the first castellation member 70 and the castellation shaft 80. The castellation biasing member 74 can be disposed between the second castellation member 72 and a top surface of bore 62 and is configured to bias the first and second castellation members 70, 72 apart from each other. A portion of the first castellation member 70 can rest on retainer 84.

Figure 10A:
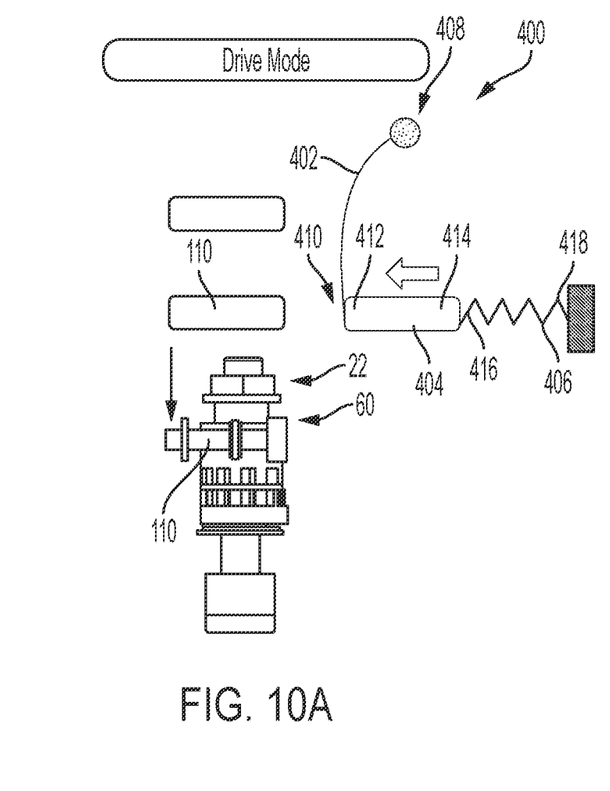
FIG. 10A is a schematic illustration of an example external mechanical actuator that may be utilized with an actuator assembly of the rocker arm assemblies shown in FIGS. 1 and 7, in a first position.
Figure 10B:
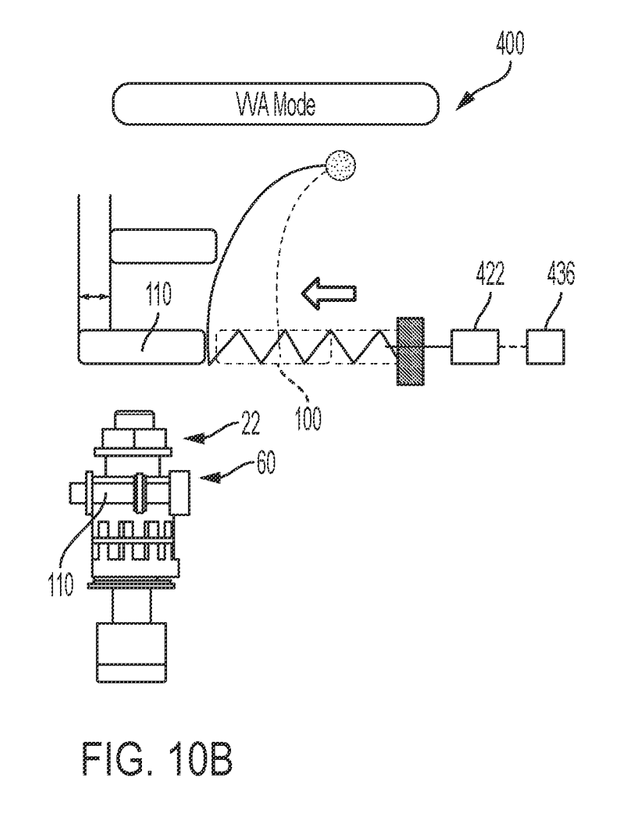
FIG. 10B is a schematic illustration of the external mechanical actuator of FIG. 10A, in a second position.

With continued reference to FIGS. 2-4, the actuator assembly 60 will be described in more detail. The actuator assembly 60 is configured to rotate the first castellation member 70 relative to the second castellation member 72 to switch the reverse reset castellated capsule assembly 22 between the active, locked position (FIG. 1) and the inactive, unlocked position (FIG. 3). In the example embodiment, the actuator assembly 60 generally includes an actuator pin 110, a retainer or plug 112, and a pin return mechanism 114 (e.g., a spring). While the actuator pin 110 is described herein as hydraulically actuated, it will be appreciated that actuator pin 110 may be actuated by other means such as, for example, electric, pneumatic, and/or electromagnetic. For example, as shown in FIG. 10, actuator pin 110 may be actuated or reset through an external lever and/or actuation pin and biasing mechanism, as described herein in more detail.

The actuator pin 110 is configured to translate within a bore 116 formed in the rocker arm 14 and generally includes a first end 118, an opposite second end 120, a first seal 122, a second seal 124, and an annular flange 126. In one example, the first end 118 includes the first seal 122 and defines a hydraulic chamber 128 between the actuator pin 110 and a rocker arm inner wall 130 that defines a portion of the bore 116. The hydraulic chamber 128 can be fluidly coupled to a source of hydraulic fluid such as control oil gallery 140, for example, via a first fluid port 142 formed in the rocker arm 14 (e.g., see FIG. 1). The second end 120 is received within plug 112 and includes the second seal 124. The pin return mechanism 114 can be disposed at least partially within a seat 132 formed in the plug 112 and can be configured to bias the actuator pin 110 toward the inner wall into the unlocked position (FIG. 3).

In the example embodiment, the annular flange 126 is received within a slot 134 formed in the first castellation member 70. However, it will be appreciated that in alternative arrangements, the annular flange 126 can be received within a slot formed in the second castellation member 72. In the example shown, the actuator pin 110 can actuate as a result of high pressure fluid entering the hydraulic chamber 128 behind the actuator pin 110, thereby translating actuator pin 110 within bore 116. This causes rotational movement of the first castellation member 70, as described herein in more detail. The fluid can be pressurized engine oil or other hydraulic fluid.

As discussed, the reverse reset castellated capsule assembly 22 is movable between the inactive (unlocked) position and the active (locked) position by the actuator assembly 60. In the unlocked, inactive position (FIG. 3), the second teeth 104 of second castellation member 72 are aligned with the first valleys 102 of the first castellation member 70, and the first teeth 100 of the first castellation member 70 are aligned with the second valleys 106 of the second castellation member 72 such that the second castellation member 72 slides inside the first castellation member 70 and the reverse reset castellated capsule assembly 22 collapses. In the locked, active position (FIG. 1), the actuator assembly 60 rotates the first castellation member 70 relative to the second castellation member 72 so the first and second teeth 100, 104 are aligned such that the second castellation member 72 is locked with the first castellation member 70 and VVA (e.g., LIVC or iEGR with exhaust rocker arm assembly 11) is activated.

With continued reference to FIG. 1, once the VVA function is performed, it is desirable to reset the castellated capsule assembly 22 and return to the unlocked position. In the example embodiment, in order to reset the capsule assembly 22, hydraulic chamber 128 is drained through a second fluid port 144 formed in the rocker arm 14 to an outlet port 146. The second fluid port 144 passes through the lost motion spigot assembly 20 and includes a first portion 148 extending between the hydraulic chamber 128 and an upper portion 150 of bore 40, and a second portion 152 extending between the bore upper portion 150 and the outlet port 146. As shown, guide 44 extends through bore upper portion 150 and includes an outer surface 156 having a notch or recess 158 formed therein to provide a passage to fluidly couple the second fluid port first portion 148 and the second fluid port second portion 152 when the recess 158 is slidingly disposed therebetween.

Figure 5:
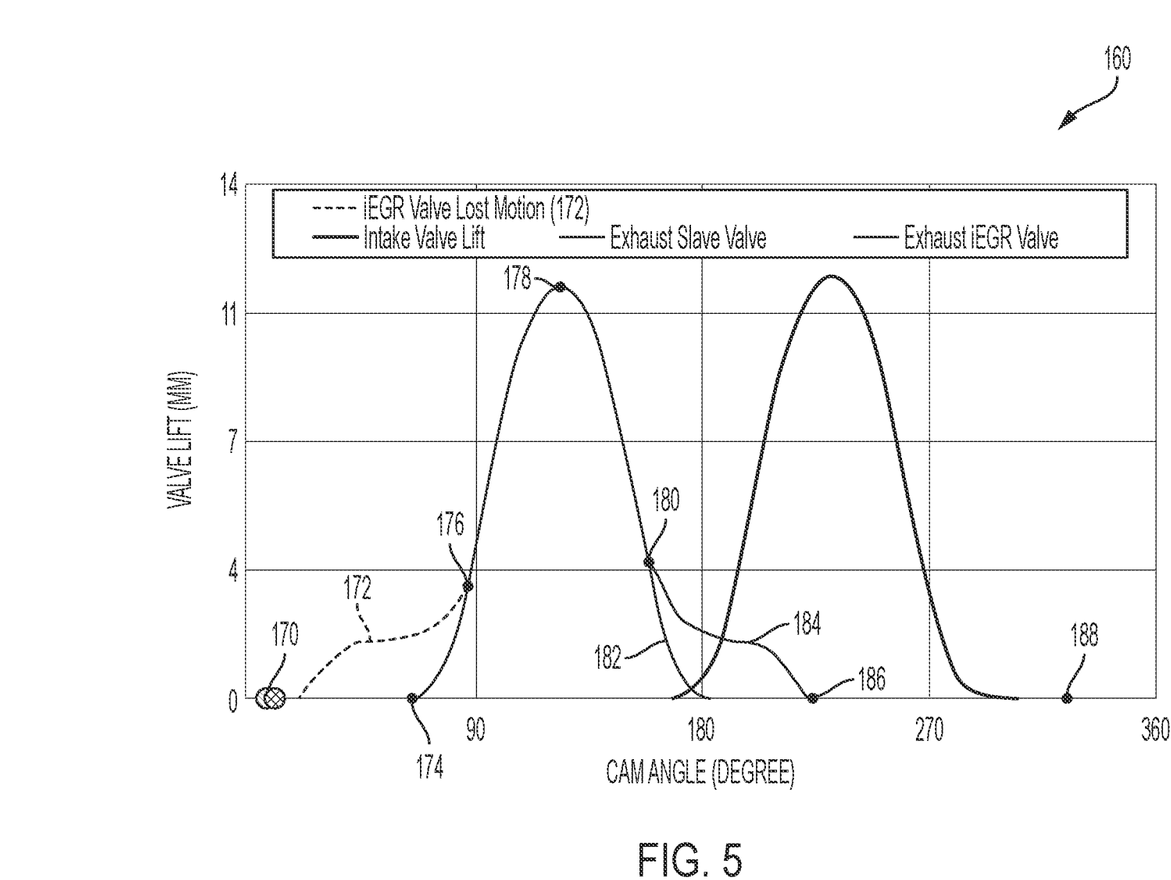
FIG. 5 is a graph of an example iEGR mode lift profile of the valvetrain assembly shown in FIG. 1.
Figure 6:
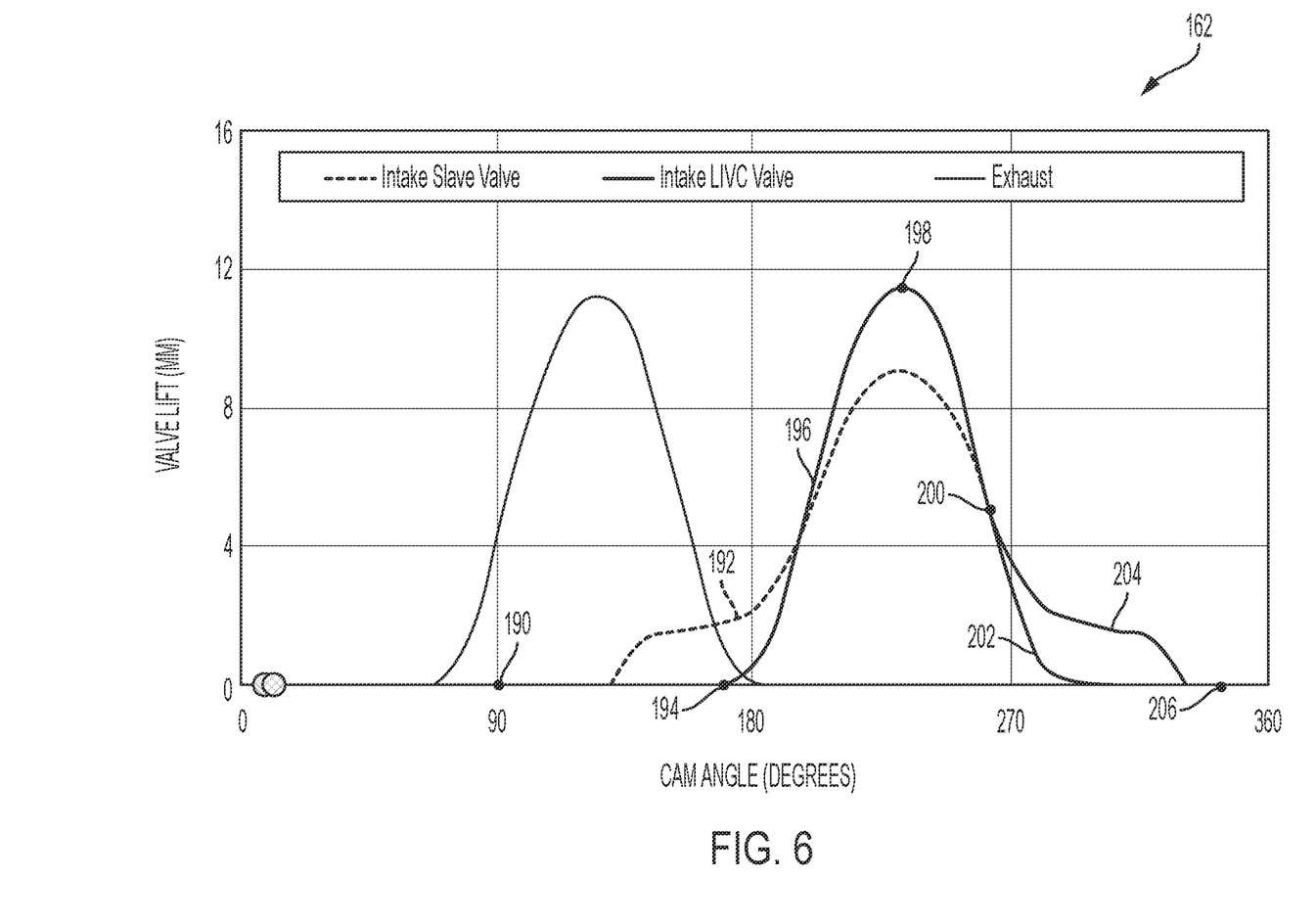
FIG. 6 is a graph of an example LIVC mode lift profile of the valvetrain assembly shown in FIG. 1.
Figure 8:
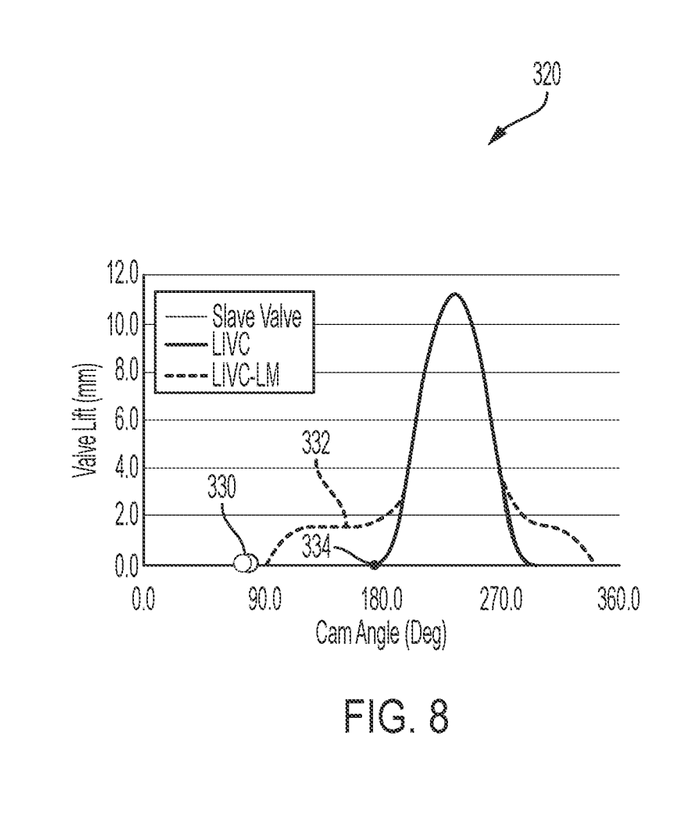
FIG. 8 is a graph of an example drive mode lift profile of the valvetrain assembly shown in FIG. 7.

FIGS. 5 and 6 illustrate valve lift plots showing example operations of the valvetrain assembly 10 where reverse reset of the castellated capsule assembly 22 is achieved through the (i) hydraulic releasing of oil through the oil channel 144 passing through the lost motion mechanism 20. More specifically, FIG. 5 illustrates a plot 160 showing an example operation of valvetrain assembly 10 in the iEGR mode, and FIG. 6 illustrates a plot 162 illustrating an example operation of valvetrain assembly 10 in the LIVC mode. When not operating in iEGR mode or LIVC mode, valvetrain 10 may be operated in a drive mode, for example, as shown in FIG. 8.

With reference now to FIG. 5, an example iEGR operation of valvetrain assembly 10 with exhaust rocker arm assembly 11 including reverse reset of capsule assembly 22 via second fluid port 144 is described in more detail. The valvetrain assembly 10 may be switched between the drive mode and the iEGR mode by a controller 136 (FIG. 1). As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

When the engine is in the iEGR mode, operation begins when the base circle of a cam lift profile 32 engages the rocker arm 14 (e.g., via a roller 138, FIG. 1), as shown in FIG. 5 and represented as point 170. At this point, because control oil gallery 140 is not fluidly connected to rocker arm fluid port 142, there is no supply of high pressure fluid (e.g., oil) to the hydraulic chamber 128. Thus, there is not enough pressure to overcome the pin return mechanism 114 and move actuator pin 110. As such, the actuator pin 110 is biased by pin return mechanism 114 into a default position, which corresponds to the inactive position of capsule assembly 22. Thus, as shown in FIG. 5, when motion of the cam lift profile 32 causes rotation of the exhaust rocker arm 14, the capsule assembly 22 collapses and does not transfer motion to the exhaust valve 26, as shown by line 172. Moreover, at the same time, motion of the spigot assembly 20 is absorbed by lost motion biasing mechanism 46 such that motion is not transferred to the valve bridge 18 or exhaust valves 24, 26.

At point 174, the cam lift profile 32 rotates the rocker arm 14 even farther to where lost motion biasing mechanism 46 no longer absorbs rocker arm motion, thereby causing downward movement of valve bridge 18 and opening of both exhaust valves 24, 26 during the standard time (exhaust stroke). At this point, control oil gallery 140 is connected to the rocker arm fluid port 142, but the capsule assembly remains in a lost motion state at least in part due to no supply of pressurized fluid from an oil control valve (OCV). Moreover, guide 44 is translated in bore upper portion 150 such that recess 158 does not connect the second fluid port first and second portions 148, 152, thereby preventing fluid from exiting outlet port 146.

At point 176, oil is supplied from the rocker shaft 16 to the hydraulic chamber 128 via control oil gallery 140 and rocker arm fluid port 142, thereby resetting capsule assembly 22 into the active position. At point 178, the exhaust valves 24, 26 reach maximum lift. As the cam lift profile 32 continues to rotate and the exhaust valves 24, 26 begin to close, the capsule assembly 22 comes into contact with the iEGR exhaust valve 26 at point 180. Accordingly, the exhaust valve 24 follow a normal lift operation (line 182), and exhaust valve 26 follows an iEGR lift (line 184) until both exhaust valves 24, 26 are closed and the cam lift profile 32 returns to base circle at point 186. At this point, oil gallery 140 is disconnected from the rocker arm fluid port 142, and guide 44 is translated such that recess 158 now fluidly connects the second fluid port first and second portions 148, 152, thereby enabling fluid to exit outlet port 146 and reset the capsule assembly 22 into the deactivated position at point 188.

With reference now to FIG. 6, an example LIVC operation of valvetrain assembly 10 with intake rocker arm assembly 12 including reverse reset of capsule assembly 22 via second fluid port 144 is described in more detail. The valvetrain assembly 10 may be switched between the drive mode and the LIVC mode by controller 136. When the engine is in the LIVC mode, operation beings when the base circle of a cam lift profile 32 engages the rocker arm 14, as shown in FIG. 6 and represented as point 190.

At this point, because control oil gallery 140 is not fluidly connected to rocker arm fluid port 142, there is no supply of high pressure fluid (e.g., oil) to the hydraulic chamber 128. Thus, there is not enough pressure to overcome the pin return mechanism 114 and move actuator pin 110. As such, the actuator pin 110 is biased by pin return mechanism 114 into a default position, which corresponds to the inactive position of capsule assembly 22. Thus, as shown in FIG. 4, when motion of the cam lift profile 32 causes rotation of the intake rocker arm 14, the capsule assembly 22 collapses and does not transfer motion to the intake valve 26, as shown by line 192. Moreover, at the same time, motion of the spigot assembly 20 is absorbed by lost motion biasing mechanism 46 such that motion is not transferred to the valve bridge 18 or intake valves 24, 26.

At point 194, the cam lift profile 32 rotates the rocker arm 14 even farther to where lost motion biasing mechanism 46 no longer absorbs rocker arm motion, thereby causing downward movement of valve bridge 18 and opening of both intake valves 24, 26 during the standard time (intake stroke). At this point, control oil gallery 140 is connected to the rocker arm fluid port 142, but the capsule assembly remains in a lost motion state. Moreover, guide 44 is translated in bore upper portion 150 such that recess 158 does not connect the second fluid port first and second portions 148, 152, thereby preventing fluid from exiting outlet port 146.

At point 196, oil is supplied from the rocker shaft 16 to the hydraulic chamber 128 via control oil gallery 140 and rocker arm fluid port 142, thereby resetting capsule assembly 22 into the active position. At point 198, the intake valves 24, 26 reach maximum lift. As the cam lift profile 32 continues to rotate and the intake valves 24, 26 begin to close, the capsule assembly 22 comes into contact with the LIVC intake valve 26 at point 200. Accordingly, the intake valve 24 follows a normal lift operation (line 202), and intake valve 26 follows an LIVC lift (line 204) until both intake valves 24, 26 are closed and the cam lift profile 32 returns to base circle at point 206. At this point, oil gallery 140 is disconnected from the rocker arm fluid port 142, and guide 44 is translated such that recess 158 now fluidly connects the second fluid port first and second portions 148, 152, thereby enabling fluid to exit outlet port 146 and reset the capsule assembly 22 into the deactivated position at point 206.

With additional reference to FIG. 7, another example intake valve rocker arm assembly 12 will be described in more detail. In the illustrated example, the intake valve rocker arm assembly 12 can generally include an intake rocker arm 214 that rotates about a rocker shaft 216, a valve bridge 218, a lost motion spigot assembly 220, and a capsule assembly 22.

In the example embodiment, the valve bridge 218 is configured to engage first and second intake valves 224, 226 associated with a cylinder of the engine. In the illustrated example, the first intake valve 224 is biased by a valve spring 228, and the second intake valve 226 is biased by a valve spring 230. The intake rocker arm 214 rotates around the rocker shaft 216 based on a lift profile of a cam shaft (not shown), as described herein in more detail, and a pass through pin 236 is positioned on the valve bridge 218 to enable actuation of intake valve 226 without actuation of valve bridge 218 or first intake valve 224.

With continued reference to FIG. 7, in the example embodiment, the lost motion spigot assembly 220 is disposed within a bore 240 formed in the rocker arm 214 and generally includes a shaft 242, a guide 244, a lost motion biasing mechanism 246 (e.g., a spring), an e-foot 248, and a nut 250. The shaft 242 includes a first end 252 and an opposite second end 254 and extends through the guide 244, which is disposed within the bore 240. The lost motion biasing mechanism 246 is disposed within a cavity 256 and is seated between the guide 244 and an upper wall 258 partially defining the rocker arm bore 240. The e-foot 248 is coupled to or operably associated with the shaft first end 252, and the nut 250 is threadably secured to the shaft second end 254. The valve lash set at a central contact point of the bridge 218 may be adjusted by way of shaft 242 and nut 250. In this regard, the nut 250 can be adjusted (e.g., rotated) to provide a desired lost motion stroke (LMS). An anti-rotation mechanism (not shown) such as a screw extends at least partially through the rocker arm 214 and is configured to facilitate preventing rotation of the lost motion spigot assembly 220 within the bore 240. Other configurations may be used.

In the example embodiment, the capsule assembly 22 is operably associated with an actuator assembly 260 that is the same or similar to the actuator assembly 60 shown in FIGS. 3 and 4, and like parts are indicated by like reference numerals. Actuator assembly 260 functions in the same or similar manner to actuator assembly 60 and, as such, is hydraulically controlled between a first position and a second position to mechanically move the capsule assembly 22 between the respective locked position and unlocked position.

With continued reference to FIG. 7, in the illustrated example, the capsule assembly 22 shown in FIG. 3 is at least partially disposed within a bore 262 formed in the rocker arm 214 and generally includes a mechanical lash adjuster assembly 264, a first castellation member 70, a second castellation member 72, and a castellation biasing member 74. An anti-rotation mechanism (not shown) such as a screw extends at least partially through the rocker arm 214 and is configured to facilitate preventing rotation of at least a portion (e.g., second castellation member 72) of the capsule assembly 22 within the bore 262.

The mechanical lash adjuster assembly 264 generally includes a castellation shaft 280, a lash adjustment screw 282, a retainer 284, an e-foot 286, a castellation nut 288, and a stop screw and washer 290. The castellation shaft 280 includes a first end 292 and an opposite second end 294 and extends through the lash adjustment screw 282 and the retainer 284, which are disposed at least partially within the rocker arm bore 262. Moreover, the castellation shaft 280 can be configured to slide within lash adjustment screw 282 and retainer 284. The e-foot 286 is coupled to or operably associated with the castellation shaft first end 292, and stop screw and washer 290 can be threadably secured to an inner bore formed in the castellation shaft second end 294. The castellation nut 288 is threadably secured to the lash adjustment screw 282. The valve lash set at a contact point of the bridge 218 may be adjusted by way of lash adjustment screw 282 and castellation nut 288.

In the example embodiment, the first castellation member 70 can be a cup-like castellated capsule body having a series of first teeth 100 and first valleys 102, and the second castellation member 72 can be a cup-like castellated capsule body having a series of second teeth 104 and second valleys 106. As described herein in more detail, the castellation members 70, 72 can be positioned in the locked position where the first and second teeth 100, 104 engage each other, or in the unlocked position (e.g., FIG. 3) where the first and second teeth 100, 104 are respectively received within the second and first valleys 106, 102.

As shown in FIG. 7, in the example embodiment, the first castellation member 70 is seated on the retainer 284 between the lash adjustment screw 282 and the retainer 284, and the second castellation member 72 is seated on the castellation shaft 280 between the first castellation member 70 and the castellation shaft 280. The castellation biasing member 74 can be disposed between the second castellation member 72 and the first castellation member 70 (or the retainer 284, which engages the first castellation member 70) and is configured to bias the first and second castellation members 70, 72 apart from each other.

As discussed, the actuator assembly 260 is the same or similar to actuator assembly 60. In a similar manner, the hydraulic chamber 128 is fluidly coupled to a source of hydraulic fluid such as a control oil gallery 300, for example, via a fluid port 302 formed in the rocker arm 214, as shown in FIG. 7. In this way, the capsule assembly 22 is movable between the inactive (unlocked) position and the active (locked) position by the actuator assembly 260. In the unlocked, inactive position (FIG. 3), the second teeth 104 of second castellation member 72 are aligned with the first valleys 102 of the first castellation member 70, and the first teeth 100 of the first castellation member 70 are aligned with the second valleys 106 of the second castellation member 72 such that the second castellation member 72 slides inside the first castellation member 70 and the capsule assembly 22 collapses. In the locked, active position (e.g., FIG. 1), the actuator assembly 260 rotates the first castellation member 70 relative to the second castellation member 72 so the first and second teeth 100, 104 are aligned such that the second castellation member 72 is locked with the first castellation member 70 and LIVC is activated.

Figure 9:
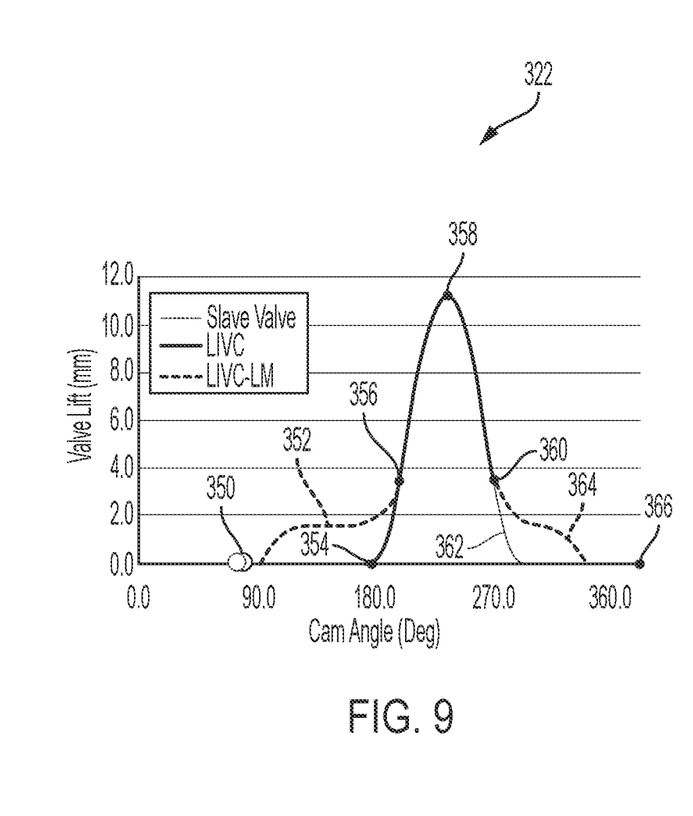
FIG. 9 is a graph of an example LIVC mode lift profile of the valvetrain assembly shown in FIG. 7.

FIGS. 8 and 9 illustrate valve lift plots showing example operations of the valvetrain assembly 10 where reverse reset of the castellated capsule assembly 22 is achieved through the (ii) hydraulic releasing of oil through a rocker shaft drain hole 304 (see FIG. 7). More specifically, FIG. 8 illustrates a plot 320 showing an example operation of valve train assembly 10 in the normal drive mode, and FIG. 9 illustrates a plot 322 showing an example operation of valvetrain assembly 10 in the LIVC mode.

With reference now to FIG. 8, an example drive mode operation of valvetrain assembly 10. The valvetrain assembly 10 may be switched between the drive mode and the LIVC mode by controller 136.

When the engine is in the drive (combustion) mode, operation begins when the base circle of cam lift profile (not shown) engages the rocker arm 214, as shown in FIG. 8 and represented as point 330. In this position, because control oil gallery 300 is not fluidly connected to rocker arm fluid port 302, there is no supply of high pressure fluid (e.g., oil) to the hydraulic chamber 128. Thus, there is not enough pressure to overcome the pin return mechanism 114 and move actuator pin 110. As such, the actuator pin 110 is biased by pin return mechanism 114 into a default position, which corresponds to the inactive position of capsule assembly 22. Thus, when motion of the cam lift profile causes rotation of the intake rocker arm 214, the capsule assembly 22 collapses and does not transfer motion to the intake valve 226, as shown by line 332. Moreover, at the same time, motion of the spigot assembly 220 is absorbed by lost motion biasing mechanism 246 such that motion is not transferred to the valve bridge 218 or intake valves 224, 226.

At point 334, the cam lift profile then rotates intake rocker arm 214 even farther to where lost motion biasing mechanism 246 no longer absorbs rocker arm motion, thereby causing downward movement of valve bridge 218 and opening of intake valves 224, 226 during the standard time (intake stroke). At this point, control oil gallery 300 is connected to the rocker arm fluid port 302, but because an oil control valve (OCV) 306 is OFF, the capsule assembly 22 remains in a lost motion state. Accordingly, there is no capsule reset. As shown in FIG. 8, as the cam lift profile returns to the base circle, capsule assembly 22 goes into lost motion, and intake valves 224, 226 close at the standard time (end of intake stroke).

With reference now to FIG. 9, an example LIVC operation of valvetrain assembly 10 with intake rocker arm assembly 12 including reverse reset of capsule assembly 22 via drain hole 304 is described in more detail. The valvetrain assembly 10 may be switched between the drive mode and the LIVC mode by controller 136 and OCV 306 turned ON to supply pressurized fluid via control gallery 300. When the engine is in the LIVC mode, operation beings when the base circle of a cam lift profile engages the rocker arm 214, as shown in FIG. 9 and represented as point 350.

In this position, controller 136 supplies high pressure fluid through the control oil gallery 300. However, because control gallery 300 is not fluidly connected to the rocker arm fluid port 302, the capsule assembly 22 is oriented in a lost motion state. Thus, when motion of the cam lift profile causes rotation of the intake rocker arm 214, the capsule assembly 22 collapses and does not transfer motion to the intake valve 226, as shown by line 352. Moreover, at the same time, motion of the spigot assembly 220 is absorbed by lost motion biasing mechanism 246 such that motion is not transferred to the valve bridge 218 or intake valves 224, 226.

At point 354, the cam lift profile rotates the rocker arm 214 even farther to where lost motion biasing mechanism 246 no longer absorbs rocker arm motion, thereby causing downward movement of valve bridge 218 and opening of both intake valves 224, 226 during the standard time (intake stroke). At this point, control oil gallery 300 is connected to the rocker arm fluid port 302 and high pressure fluid is supplied to the hydraulic chamber 128.

At point 356, the high pressure fluid acts on the actuator pin 110 and overcomes the biasing force of pin biasing mechanism 114, which represents a reset point where the rocker arm assembly 12 beings to reset. The high pressure fluid translates actuator pin 110 within bore 116, which causes subsequent rotational movement of the first castellation member 70 relative to the second castellation member 72, thereby transitioning capsule assembly 22 from the unlocked, inactive position to the rigid locked, active position (e.g., FIG. 1). At point 358, the capsule assembly 22 is locked and the intake valves 224, 226 reach maximum lift.

As the cam lift profile continues to rotate and the intake valves 224, 226 begin to close, the capsule assembly 22 comes into contact with the LIVC intake valve 226 at point 360. Accordingly, the intake valve 224 follows a normal lift operation (line 362), and intake valve 226 follows an LIVC lift (line 364) until both intake valves 224, 226 are closed and the cam lift profile 32 returns to base circle at point 366. Thus, intake valve 226 performs a late intake valve closing. At this point, oil gallery 300 is disconnected from the rocker arm fluid port 302, and fluid in the hydraulic chamber 128 is drained via drain hole 304 to reset the capsule assembly 22 into the deactivated position.

With additional reference now to FIGS. 10A and 10B, an alternative embodiment of valvetrain assembly 10 is shown where actuator assembly 60 is activated/reset by an external mechanical actuator 400 rather than via a flow of hydraulic fluid through control oil gallery 140, 300. In the example embodiment, external mechanical actuator 400 generally includes a lever 402, an actuation pin 404, and a biasing mechanism 406 (e.g., a spring). The lever 402 can be an elastic member having a first end 408 and a second end 410. The lever first end 408 is rotatably coupled to a portion of the vehicle (not shown), and the lever second end 410 is coupled to the actuation pin 404. The actuation pin 404 includes a first end 412 and a second end 414. The pin first end 412 is coupled to or operably associated with the lever second end 410, and the pin second end 414 is coupled to the biasing mechanism 406. The biasing mechanism 406 generally includes a first end 416 and an opposite second end 418. The biasing mechanism first end 416 is coupled to the pin second end 414, and the biasing mechanism second end 418 is coupled to a portion 420 of the vehicle or of actuator 400 coupled to the vehicle.

In operation, in drive mode (FIG. 10A), the biasing mechanism 406 is configured to bias the actuation pin 404 away from and out of contact with the actuator pin 110 of the actuator assembly 60. As such, the lever 402 does not contact the actuator pin 110. In the VVA mode (FIG. 10B), pressurized fluid is supplied from an OCV 422 and overcomes the bias of biasing mechanism 406 to thereby push actuation pin 404 and lever 402 into contact with actuator pin 110. As such, the actuator pin 110 translates within bore 116, which causes subsequent rotational movement of the first castellation member 70 relative to the second castellation member 72, thereby transitioning capsule assembly 22 from the unlocked, inactive position to the rigid locked, active position. In this way, external mechanical actuator is configured to selectively actuate the actuator assembly 60 to operate the valvetrain assembly 10 between a drive mode (e.g., open valves as shown in FIG. 8) and a VVA mode (e.g., open valves as shown in FIGS. 5, 6, and 9).

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A rocker arm assembly operable to selectively open first and second engine valves of an engine in an engine drive mode and at least one of a late intake valve closing (LIVC) mode and an internal exhaust gas recirculation (iEGR) mode, the rocker arm assembly comprising:
    a rocker arm configured to rotate about a rocker shaft; the rocker arm defining a fluid port and a bore;
    a reverse reset capsule assembly (RRCA) configured to be switched between (i) a locked position so as to perform one of an LIVC operation and an iEGR operation, and (ii) an unlocked position so as to perform neither the LIVC operation or nor the iEGR operation; and
    a hydraulically controlled actuator assembly configured to selectively switch the RRCA between the locked and unlocked positions,
    wherein the RRCA is reset from one of the locked and unlocked positions to a remaining one of the locked and unlocked positions when hydraulic fluid is drained through the fluid port,
    wherein the bore is configured to received a lost motion assembly, and
    wherein the fluid port passes through the bore.

2. The rocker arm assembly of claim 1, wherein the lost motion assembly comprises a guide including an outer surface defining a recess, the guide configured to selectively translate between a first position in which the guide fluidly blocks the fluid port, and a second position in which the guide enables the hydraulic fluid to flow through the fluid port via the recess.

3. The rocker arm assembly of claim 1, wherein the RRCA comprises a first castellation member, a second castellation member, and a castellation biasing member that biases the first and second castellation members apart from each other.

4. The rocker arm assembly of claim 3, wherein the first castellation member comprises a series of first teeth and first valleys, and wherein the second castellation member comprises a series of second teeth and second valleys.

5. The rocker arm assembly of claim 4, wherein a width of the first teeth is equal to a width of the second teeth.

6. The rocker arm assembly of claim 5, wherein the first and second castellation members are configured to collapse toward each other when the RRCA is in the unlocked position.

7. The rocker arm assembly of claim 3, wherein the first castellation member rotates relative to the second castellation member when the RRCA switches from the unlocked position to the locked position.

8. The rocker arm assembly of claim 1, wherein the hydraulically controlled actuator assembly comprises an actuator pin slidingly disposed within a third bore formed in the rocker arm, and wherein a hydraulic chamber is defined in the third bore between the actuator pin and the rocker arm.

9. The rocker arm assembly of claim 8, wherein the hydraulic chamber is fluidly coupled to a source of hydraulic fluid so as to selectively switch the actuator pin between a first position which switches the RRCA into the locked position, and a second position which switches the RRCA into the unlocked position.

10. The rocker arm assembly of claim 1, wherein the lost motion assembly is configured as a lost motion spigot assembly at least partially disposed within the bore.

11. The rocker arm assembly of claim 10, wherein the lost motion spigot assembly comprises:
    a guide;
    a shaft extending through the guide; and
    a lost motion biasing mechanism seated between the guide and an inner wall of the rocker arm defining the bore.

12. The rocker arm assembly of claim 1, wherein the RRCA is disposed within a second bore formed in the rocker arm, the RRCA comprising:
    a retainer;
    a lash adjustment screw;
    a first castellation member;
    a second castellation member operatively associated with the first castellation member;
    a castellation shaft extending through the retainer, the lash adjustment screw, and the first and second castellation members; and
    a castellation biasing mechanism disposed between the first and second castellation members and configured to bias the first and second castellation members apart from each other.

13. The rocker arm assembly of claim 12, wherein the RRCA further comprises a castellation nut coupled to the lash adjustment screw, and wherein the castellation shaft is configured to slide within the lash adjustment screw.

14. The rocker arm assembly of claim 1, wherein the RRCA is reset when the hydraulic fluid is drained through the fluid port and further drained through a rocker shaft drain hole formed in the rocker arm.

15. A valvetrain assembly comprising:
    a first engine valve;
    a second engine valve;
    a valve bridge operatively associated with the first and second engine valves; and
    a rocker arm assembly comprising:

a rocker arm rotatably coupled to a rocker shaft, the rocker arm defining a first bore and a second bore;

a lost motion spigot assembly at least partially disposed within the first bore, the lost motion spigot assembly configured to selectively engage the valve bridge so as to actuate the first and second engine valves, the lost motion spigot assembly comprising:

a guide;

a shaft extending through the guide; and a lost motion biasing mechanism seated between the guide and an inner wall of the rocker arm defining the first bore;

a reverse reset capsule assembly (RRCA) at least partially disposed within the second bore, the RRCA configured to be switched between (i) a locked position which engages only the second valve so as to perform one of a late intake valve closing (LIVC) operation and an internal exhaust gas recirculation (iEGR) operation, and (ii) an unlocked position so as to perform neither the LIVC operation nor the iEGR operation; and an actuator assembly at least partially disposed within a third bore formed in the rocker arm, the actuator assembly configured to selectively switch the RRCA between the first and second positions.

16. A rocker arm assembly operable to selectively open first and second engine valves of an engine in an engine drive mode and at least one of a late intake valve closing (LIVC) mode and an internal exhaust gas recirculation (iEGR) mode, the rocker arm assembly comprising:

a rocker arm configured to rotate about a rocker shaft, the rocker arm defining a bore;

a lost motion spigot assembly at least partially disposed within the bore, the lost motion spigot assembly comprising:

a guide;

a shaft extending through the guide; and a lost motion biasing mechanism seated between the guide and an inner wall of the rocker arm defining the bore;

a reverse reset capsule assembly (RRCA) configured to be switched between (i) a locked position so as to perform one of an LIVC operation and an iEGR operation, and (ii) an unlocked position so as to perform neither the LIVC operation nor the iEGR operation; and an actuator assembly configured to selectively switch the RRCA between the locked and unlocked positions.

17. A rocker arm assembly operable to selectively open first and second engine valves of an engine in an engine drive mode and at least one of a late intake valve closing (LIVC) mode and an internal exhaust gas recirculation (iEGR) mode, the rocker arm assembly comprising:

a rocker arm configured to rotate about a rocker shaft, the rocker arm defining a bore;

a reverse reset capsule assembly (RRCA) disposed within the bore, the RRCA configured to be switched between (i) a locked position so as to perform one of an LIVC operation and an iEGR operation, and (ii) an unlocked position so as to perform neither the LIVC operation nor the iEGR operation, the RRCA comprising:

a retainer;

a lash adjustment screw;

a first castellation member;

a second castellation member operatively associated with the first castellation member;

a castellation shaft extending through the retainer, the lash adjustment screw, and the first and second castellation members;

a castellation biasing mechanism disposed between the first and second castellation members and configured to bias the first and second castellation members apart from each other; and a castellation nut coupled to the lash adjustment screw such that the castellation shaft is configured to slide within the lash adjustment screw; and an actuator assembly configured to selectively switch the RRCA between the locked and unlocked positions.

18. The rocker arm assembly of claim 17, wherein the actuator assembly is mechanically controlled via a lever.

19. The rocker arm assembly of claim 18, wherein the lever is actuated via at least one of an actuation pin or oil pressure.

* * * * *